US012783087B2

(12) United States Patent
Seo et al.

(10) Patent No.: US 12,783,087 B2
(45) Date of Patent: Nov. 3, 2026

(54) TOUCHSCREEN MODULE WITH IMPROVED TOUCH SENSITIVITY AND REDUCED SENSITIVITY DEVIATION

(71) Applicant: G2TOUCH Co., LTD., Seongnam-si (KR)

(72) Inventors: Jie On Seo, Seongnam-Si (KR); Hyuk Jae Song, Seongnam-si (KR); Shu Yang, Beijing (CN)

(73) Assignee: G2TOUCH Co., LTD., Seongnam-si (KR)

( * ) Notice: Subject to any disclaimer, the term of this patent is extended or adjusted under 35 U.S.C. 154(b) by 0 days.

(21) Appl. No.: 19/279,357

(22) Filed: Jul. 24, 2025

(65) Prior Publication Data

US 2026/0072544 A1 Mar. 12, 2026

(30) Foreign Application Priority Data

Sep. 10, 2024 (KR) ........................ 10-2024-0122918

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04107* (2013.01)

(58) Field of Classification Search
None
See application file for complete search history.

(56) References Cited

U.S. PATENT DOCUMENTS

2012/0235691 A1* 9/2012 Ho ........................ G06F 3/0443 324/658
2019/0296051 A1 9/2019 Qin et al.
2024/0045529 A1* 2/2024 Fang ..................... G06F 3/0412

FOREIGN PATENT DOCUMENTS

EP 4 216 044 A1 7/2023
KR 10-2015-0120922 A 10/2015
KR 10-2020-0078136 A 7/2020
KR 10-2023-0021815 A 2/2023

* cited by examiner

*Primary Examiner* — Nicholas J Lee

(57) ABSTRACT

The present invention is aimed at solving problems of conventional touchscreen modules, and provides a touchscreen module that prevents occurrence of coupling capacitance between display drive components and display drive signal lines while reducing touch sensitivity deviation due to a difference in length between sensor signal lines. The touchscreen module with improved touch sensitivity and reduced sensitivity deviation according to the present invention can compensate for sensitivity deviation through adjustment in lengths of touch sensor signal lines in a PCB or FPCB, and can prevent generation of coupling noise between display drive signal lines and extensions of the touch sensor signal lines through a shielding plate.

8 Claims, 5 Drawing Sheets

TOUCHSCREEN MODULE WITH IMPROVED TOUCH SENSITIVITY AND REDUCED SENSITIVITY DEVIATION

CROSS-REFERENCE TO RELATED APPLICATION

The present application claims priority to and the benefit of Korean Patent Application No. 10-2024-0122918, filed on Sep. 10, 2024, in the Korean Intellectual Property Office, the entire disclosure of which is incorporated herein by reference.

TECHNICAL FIELD

The present invention relates to a touchscreen module, and more particularly to a touchscreen module that prevents occurrence of coupling capacitance between a display drive component and a display drive signal line while reducing touch sensitivity deviation due to a difference in length between sensor signal lines.

BACKGROUND ART

In general, a touch panel is an input device formed on or coupled to a display device, such as a liquid crystal display (LCD), a plasma display panel (PDP), an organic light emitting diode (OLED) display, an active matrix organic light emitting diode (AMOLED) display, and the like, to generate a location signal corresponding to a location on the touch panel being touched by an object, such as a finger or a pen. Such touch panels are used in a wide range of applications including small mobile terminals, industrial terminals, digital information devices (DIDs), and the like, and are expanding into various application fields.

A capacitive touch panel is a device that can determine whether a touch has occurred on the touch panel based on a change in an electrical signal generated due to a capacitance created between a touch pattern on the touch panel and a finger of the body or a touch input tool having similar conductive properties thereto.

A touchscreen module 100 includes a touch panel 110 including a plurality of touch sensors 150 and a printed circuit board (PCB) or flexible printed circuit board (FPCB) region 140 on which a touch IC 190 is mounted.

Referring to FIG. 1, the plurality of touch sensors 150 is arranged in a plurality of columns and rows on the touch panel 110 to have a matrix structure.

The touch panel 110 includes an active region 120 in which the touch sensors 150 are formed, a fan-out region 130 in which a plurality of touch sensor signal lines 160 converges to be connected to the touch IC 190, and a bonding region 180 in which the touch sensor signal lines 160 of the touch panel 110 are bonded to extensions 170 of the touch sensor signal lines 160.

The bonding region 180 may include a multiplexer for multiplexing or demultiplexing control signals from the touch IC 190 or touch signals from the touch sensors 150.

The touch sensor signal line 160 connected to each of the touch sensors 150 passes through the fan-out region 130 and is bonded to the extension 170 of the touch sensor signal line in the bonding region 180 to be connected to the touch IC 190 within the PCB or the FPCB.

The touch sensors 150 and the touch sensor signal lines 160 within the active region 120 have the same shape in each row.

However, the differences in length between the touch sensor signal lines 160 in the fan-out region 130 and between the extensions 170 of the touch sensor signal lines in the PCB or FPCB region cause a difference between touch signals generated by the touch sensors 150 in the same row. That is, sensitivity deviation occurs.

To reduce sensitivity deviation of the touchscreen panel 100, addition of sensitivity compensation signal lines or deviation compensation signal lines has been proposed.

However, spatial constraints hinder addition of the sensitivity compensation signal lines or the deviation compensation signal lines for improving sensitivity deviation to the touch sensor signal lines 160 in the active region 120 and the fan-out region 130.

Moreover, since components related to a display device and drive signal lines spatially overlap in the PCB or FPCB region 140 in which the touch IC 190 is mounted, coupling noise between the extensions 170 of the touch sensor signal lines and the drive signal lines of the display device can cause distortion of touch signals and display signals.

Therefore, there is a need for a touchscreen module with improved touch sensitivity and reduced sensitivity deviation.

PRIOR LITERATURE

Patent Document

Patent Document 1: Patent Registration Publication No. 10-1374312 (Jun. 14, 2014)

Patent Document 2: Patent Registration Publication No. 10-1609992 (Mar. 31, 2016)

DISCLOSURE

Technical Problem

The present invention is aimed at solving the aforementioned problems of conventional touchscreen modules and provides a touchscreen module that prevents occurrence of coupling capacitance between display drive components and display drive signal lines while reducing touch sensitivity deviation due to a difference in length between sensor signal lines.

Technical Solution

A touchscreen module according to one embodiment of the present invention includes:

a touch panel including a plurality of touch sensors arranged in a plurality of rows and columns and a plurality of touch sensor signal lines connected to the touch sensors, respectively;

a touch integrated circuit (IC) connected to the touch sensors through extensions of the touch sensor signal lines to control touch sensing operation of the touch sensors and to calculate touch coordinates of the touch sensors—the touch IC being mounted on a circuit board on which display drive signal lines and components for driving a display device in cooperation with the touch panel are arranged—; and at least one shielding plate formed on the circuit board to prevent occurrence of coupling capacitance between the display drive signal lines and the extension of the touch sensor signal line.

Preferably, the circuit board is a printed circuit board (PCB) or a flexible printed circuit board (FPCB).

Preferably, the shielding plate includes:

an upper shielding plate formed on the extensions of the touch sensor signal lines; and a lower shielding plate formed beneath the extensions of the touch sensor signal lines.

Preferably, the touch IC applies a driving signal to at least one of the upper shielding plate and the lower shielding plate to improve touch sensitivity of the touch sensors.

Preferably, a compensation section is formed on the circuit board to compensate for a difference in length between the touch sensor signal lines connected to the touch sensors in the same row.

Preferably, the compensation section has a zig-zag pattern in at least a segment of the extension of at least one of the touch sensor signal lines to equalize lengths of the touch sensor signal lines having different lengths.

Preferably, the compensation section is formed between the upper shielding plate and the lower shielding plate.

Preferably, a zigzag pattern segment of the extension of the touch sensor signal line is changed depending on a location of the touch IC.

Preferably, a driving voltage is applied to at least one of the upper shielding plate and the lower shielding plate to improve sensitivity of the touch sensors through increase in capacitance between the touch sensor signal lines and the shielding plate.

Effects of the Invention

According to the present invention, a touchscreen module with improved touch sensitivity and reduced sensitivity deviation can improve sensitivity of touch sensors without structural change of a touch panel.

According to the present invention, the touchscreen module with improved touch sensitivity and reduced sensitivity deviation can compensate for sensitivity deviation through adjustment in length of touch sensor signal lines in a PCB or FPCB, and can prevent generation of coupling noise between display drive signal lines and extensions of the touch sensor signal lines through a shielding plate.

DETAILED DESCRIPTION

Hereinafter, exemplary embodiments of the present invention will be described in detail with reference to the accompanying drawings.

Figure 2A:
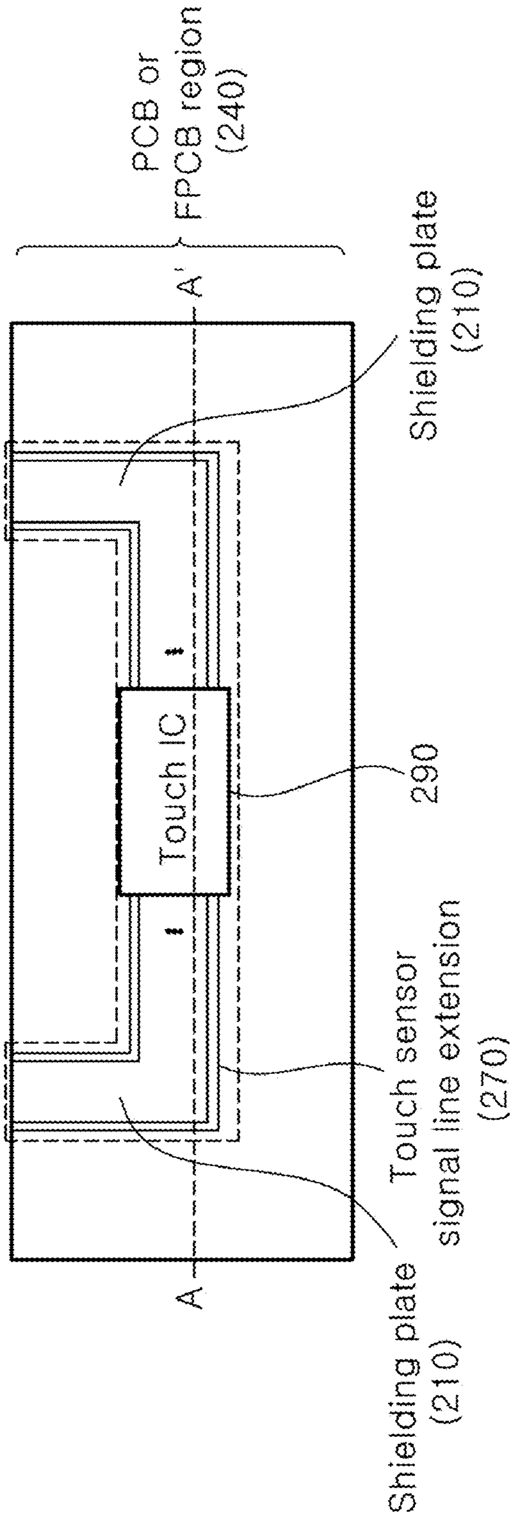
FIG. 2*a* is a view of a shielding plate formed in a printed circuit board (PCB) or flexible printed circuit board (FPCB) region of a touchscreen module with improved touch sensitivity and reduced deviation according to the present invention.

FIG. 2*a* is a view of a shielding plate formed in a printed circuit board (PCB) or flexible printed circuit board (FPCB) region of a touchscreen module with improved touch sensitivity and reduced deviation according to the present invention.

Figure 1:
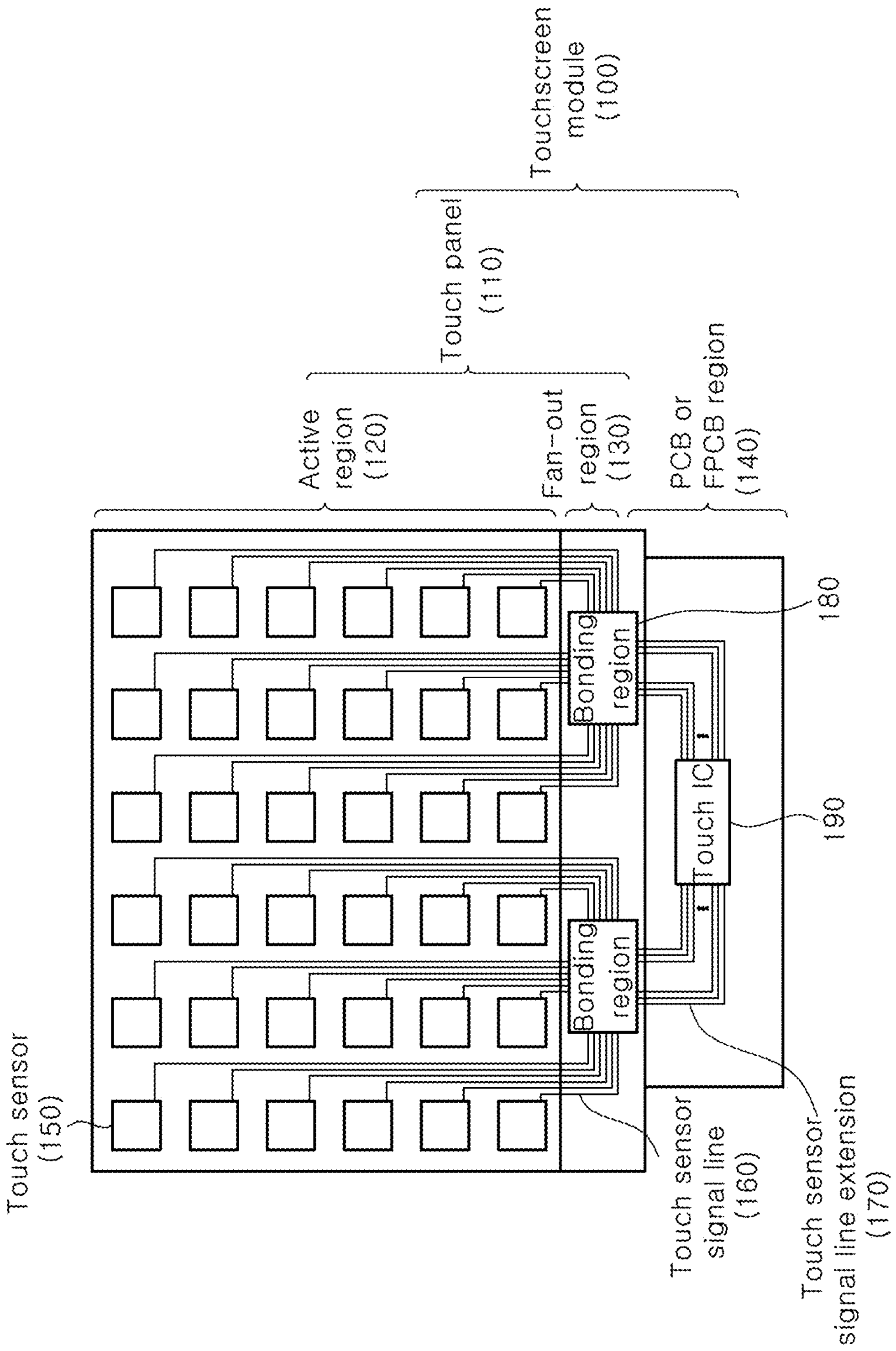
FIG. 1 is a schematic view of a touchscreen module.

A touchscreen module according to an embodiment of the present invention has the same structure as the touchscreen module 100 shown in FIG. 1. Thus, the touchscreen module 100 according to the present invention includes a touch panel 110 and a PCB or FPCB region 240.

The present invention realizes improvement in touch sensitivity without any structural change of the touch panel 110. As mentioned above, spatial constraints hinder addition of compensation signal lines within the touch panel 110 of the touchscreen module 100 shown in FIG. 1. The present invention provides a solution to this problem.

FIG. 2*a* is an enlarged view of a changed portion of the PCB or FPCB region 240 of the touchscreen module 100, as compared with FIG. 1.

The touchscreen module according to the present invention includes the touch panel 110 having a plurality of touch sensors 150 arranged in a plurality of rows and columns and a plurality of touch sensor signal lines 160 connected to the touch sensors 150, respectively, and a PCB or FPCB region 240 in which a touch integrated circuit (IC) 290 is mounted.

The touch IC 290 is connected to the touch sensors 150 through extensions 270 of the touch sensor signal lines to control touch sensing operation of the touch sensors 150 and to calculate touch coordinates of the touch sensors 150.

On the circuit board on which the touch IC 290 is mounted, display drive signal lines and components for driving a display device in cooperation with the touch panel are arranged.

Although the components for driving the display device and the display drive signal line are not specifically shown in FIG. 2*a*, the display drive signal lines and the extensions of the touch sensor signal lines 270 may spatially overlap with each other.

Coupling capacitance created due to spatial overlapping between the display drive signal lines and the extensions 270 of the touch sensor signal lines acts as noise to touch signals, thereby reducing a signal-to-noise ratio (SNR).

To address this problem, the touchscreen module according to the present invention includes at least one shielding plate 210 in the PCB or FPCB region 240.

The shielding plate 210 is formed on the circuit board to prevent occurrence of coupling capacitance between the display drive signal lines and the extensions of the touch sensor signal lines 270.

As used herein, the "circuit board" may be a printed circuit board (PCB) or a flexible printed circuit board (FPCB).

Figure 2B:
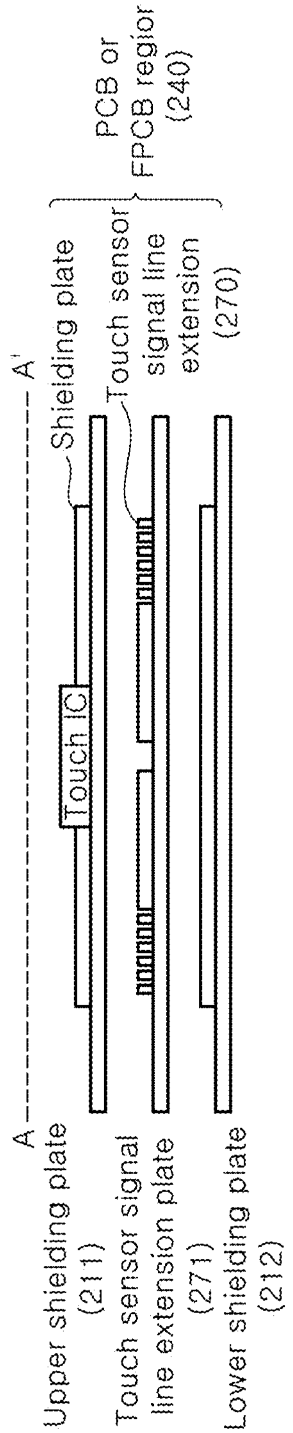
FIG. 2*b* is a side view showing arrangement of a touch sensor signal line and the shielding plate shown in FIG. 2*a*.

FIG. 2*b* is a side view showing arrangement of a touch sensor signal line and the shielding plate shown in FIG. 2*a*.

FIG. 2*b* is a side view taken along line A-A' in FIG. 2*a*.

As shown in FIG. 2*b*, the shielding plate 210 formed in the PCB or FPCB region 240 includes an upper shielding plate 211 formed on the extensions 270 of the touch sensor signal lines and a lower shielding plate 212 formed beneath the extensions 270 of the touch sensor signal lines.

In one embodiment, the touch IC 290 may apply a driving signal to at least one of the upper shielding plate 211 and the lower shielding plate 212 to improve touch sensitivity of the touch sensors 150. The driving signal may be a voltage (square wave) that swings from a driving voltage to ground or a voltage applied as DC voltage.

In the embodiment described with reference to FIG. 2*a* and FIG. 2*b*, in the PCB or FPCB region 240 on which the touch IC 290 is mounted, the shielding plates are formed on upper and lower layers of the extensions 270 of the touch sensor signal lines, which connect the touch IC 290 to the touch sensors 150, and a driving signal is applied to the shielding plates 211, 212 formed on the upper and lower layers of the extensions 270 of the touch sensor signal lines to improve touch sensitivity.

Figure 3:
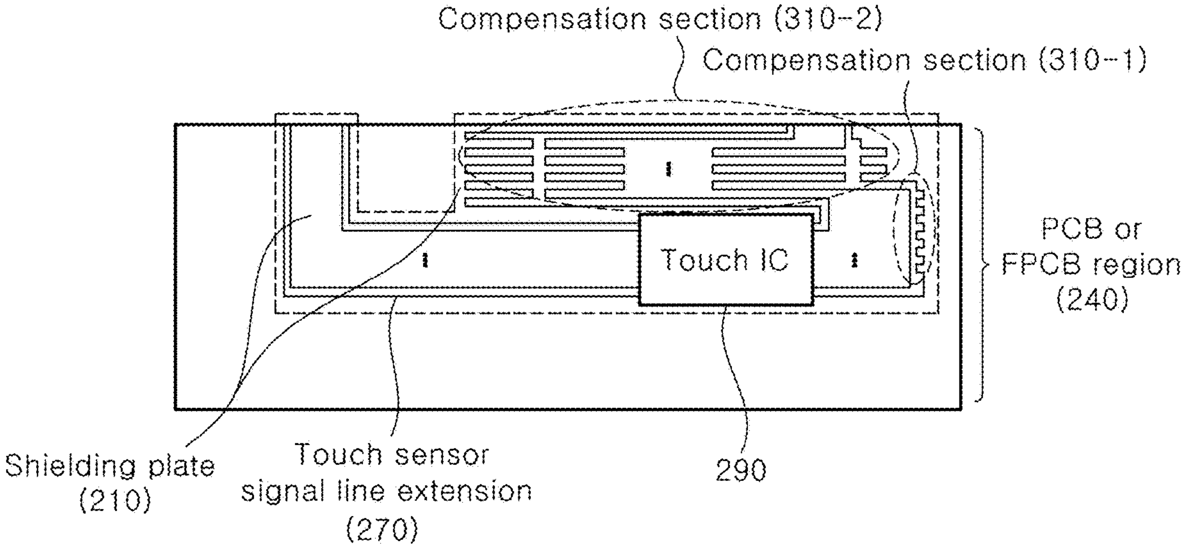
FIG. 3 is a plan view of a printed circuit board (PCB) or flexible printed circuit board (FPCB) region of a touchscreen module with touch sensitivity and reduced deviation according to another embodiment of the present invention.

FIG. 3 is a plan view of a printed circuit board (PCB) or flexible printed circuit board (FPCB) region of a touchscreen module with touch sensitivity and reduced deviation according to another embodiment of the present invention.

As mentioned above, the touchscreen module has sensitivity deviation between the touch sensors 150 in the same row due to differences in length between the touch sensor signal lines 160 in the fan-out region 130 and between the extensions 170 of the touch sensor signal lines within the PCB or FPCB region.

The difference in length between the touch sensor signal lines within the touch panel 110 or the difference in length between the extensions 270 of the sensor signal lines within the PCB or FPCB region 240 causes a difference in resistance and capacitance between the sensor signal lines, which leads to deviation in touch sensitivity.

To address this problem, the touchscreen module according to the present invention includes compensation sections 310-1, 310-2 to compensate for the difference in length between the touch sensor signal lines connected to the touch sensors in the same row on the circuit board.

In one embodiment, the compensation sections 310-1, 310-2 have a zigzag pattern in at least a segment of the extension 270 of at least one touch sensor signal line to equalize the lengths of the touch sensor signal lines having different lengths.

In one embodiment, the compensation sections 310-1, 310-2 are formed between the upper shielding plate 211 and the lower shielding plate 212.

In one embodiment, a driving signal is applied to at least one of the upper shielding plate 211 and the lower shielding plate 212 to increase capacitance between the extensions 270 of the touch sensor signal lines and the shielding plate 210, thereby improving touch sensitivity of the touch sensor 150.

Figure 4:
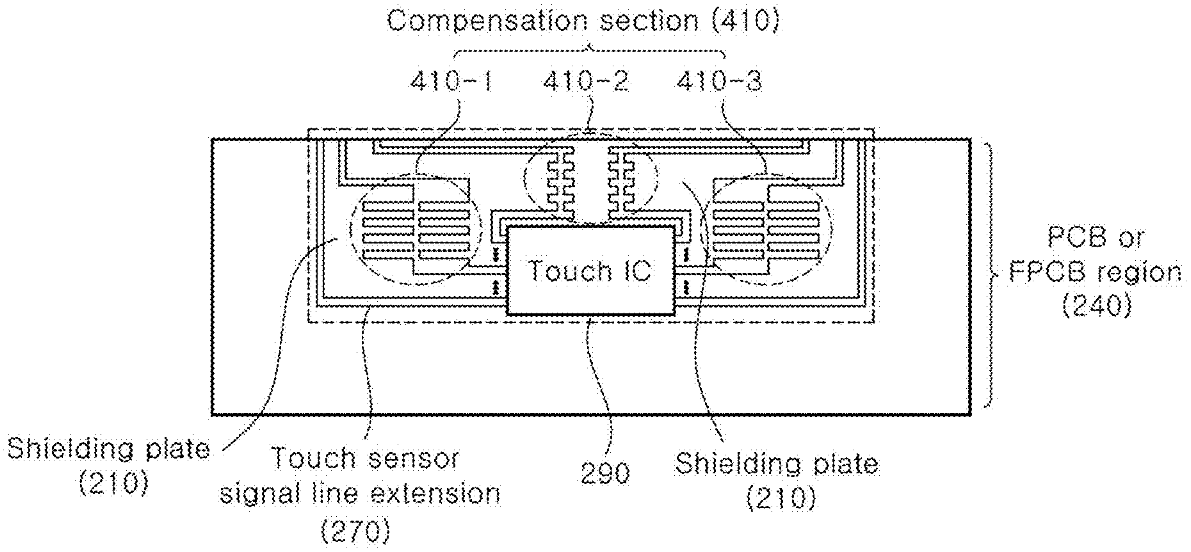
FIG. 4 is a plan view of a printed circuit board (PCB) or flexible printed circuit board (FPCB) region of a touchscreen module with touch sensitivity and reduced deviation according to a further embodiment of the present invention.

FIG. 4 is a plan view of a printed circuit board (PCB) or flexible printed circuit board (FPCB) region of a touchscreen module with touch sensitivity and reduced deviation according to a further embodiment of the present invention.

FIG. 4 shows a modification of the compensation sections shown in FIG. 3, in which the locations of the compensation sections are changed due to a change in location of the touch IC 290.

In one embodiment, a compensation section 410 including a zigzag pattern segment of the extension 270 of the touch sensor signal line is changed depending on the location of the touch IC 290.

Compared with FIG. 3, it can be seen that the compensation section shown in FIG. 4 is divided into multiple sections, as the touch IC 290 is placed near the center.

Each of the foregoing embodiments of the present invention may be practiced individually or in combination with each other. As such, it should be understood that the present invention described herein is not limited to the foregoing embodiments and the accompanying drawings, and that various substitutions, modifications, and variations can be made without departing from the scope of the invention. This will be apparent to a person having ordinary knowledge in the art.

The invention claimed is:

1. A touchscreen module comprising:

a touch panel comprising a plurality of touch sensors arranged in a plurality of rows and columns and a plurality of touch sensor signal lines connected to the touch sensors, respectively;

a touch integrated circuit (IC) connected to the touch sensors through extensions of the touch sensor signal lines to control touch sensing operation of the touch sensors and to calculate touch coordinates of the touch sensors, the touch IC being mounted on a circuit board on which display drive signal lines and components for driving a display device in cooperation with the touch panel are arranged; and at least one shielding plate formed on the circuit board to prevent occurrence of coupling capacitance between the display drive signal lines and the extension of the touch sensor signal line, wherein the shielding plate comprises:

an upper shielding plate formed on the extensions of the touch sensor signal lines; and a lower shielding plate formed beneath the extensions of the touch sensor signal lines.

2. The touchscreen module according to claim 1, wherein the circuit board is a printed circuit board (PCB) or a flexible printed circuit board (FPCB).

3. The touchscreen module according to claim 1, wherein the touch IC applies a driving signal to the upper shielding plate, or the lower shielding plate, or both to improve touch sensitivity of the touch sensor.

4. The touchscreen module according to claim 1, wherein a compensation section is formed on the circuit board to compensate for a difference in length between the touch sensor signal lines connected to the touch sensors in the same row.

5. The touchscreen module according to claim 4, wherein the compensation section has a zig-zag pattern in at least a segment of the extension of at least one of the touch sensor signal lines to equalize lengths of the touch sensor signal lines having different lengths.

6. The touchscreen module according to claim 5, wherein the compensation section is formed between the upper shielding plate and the lower shielding plate.

7. The touchscreen module according to claim 5, wherein a zigzag pattern segment of the extension of the touch sensor signal line is changed depending on a location of the touch IC.

8. The touchscreen module according to claim 3, wherein a driving voltage is applied to the upper shielding plate, or the lower shielding plate, or both to improve sensitivity of the touch sensors through increase in capacitance between the touch sensor signal lines and the shielding plate.

* * * * *